(No Model.) 2 Sheets—Sheet 2.
J. FOURNIE.
GRAIN DRILL.
No. 265,666. Patented Oct. 10, 1882.
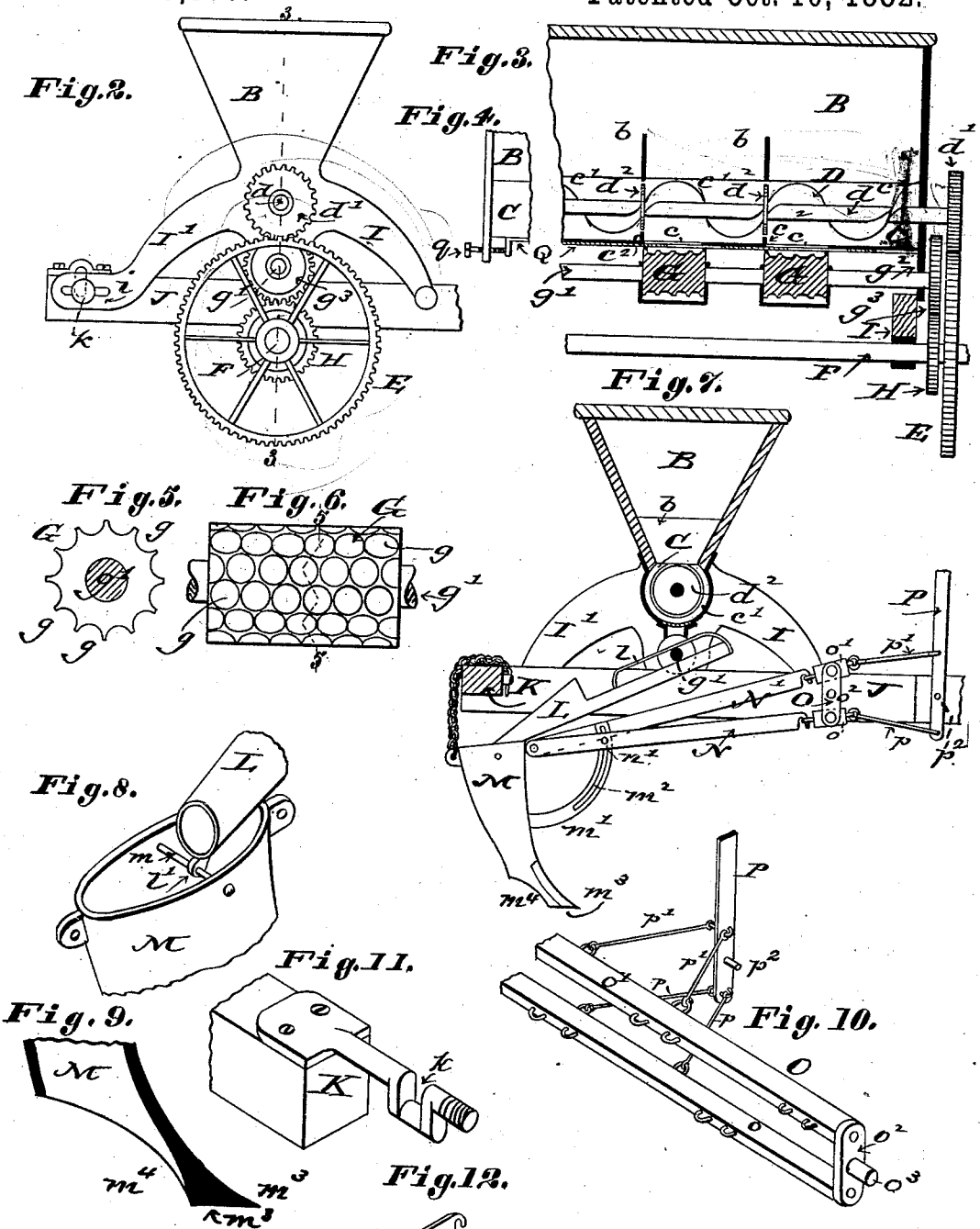
Attest:
Charles Pickles
Inventor:
Jacob Fournie
by C. D. Moody, atty.

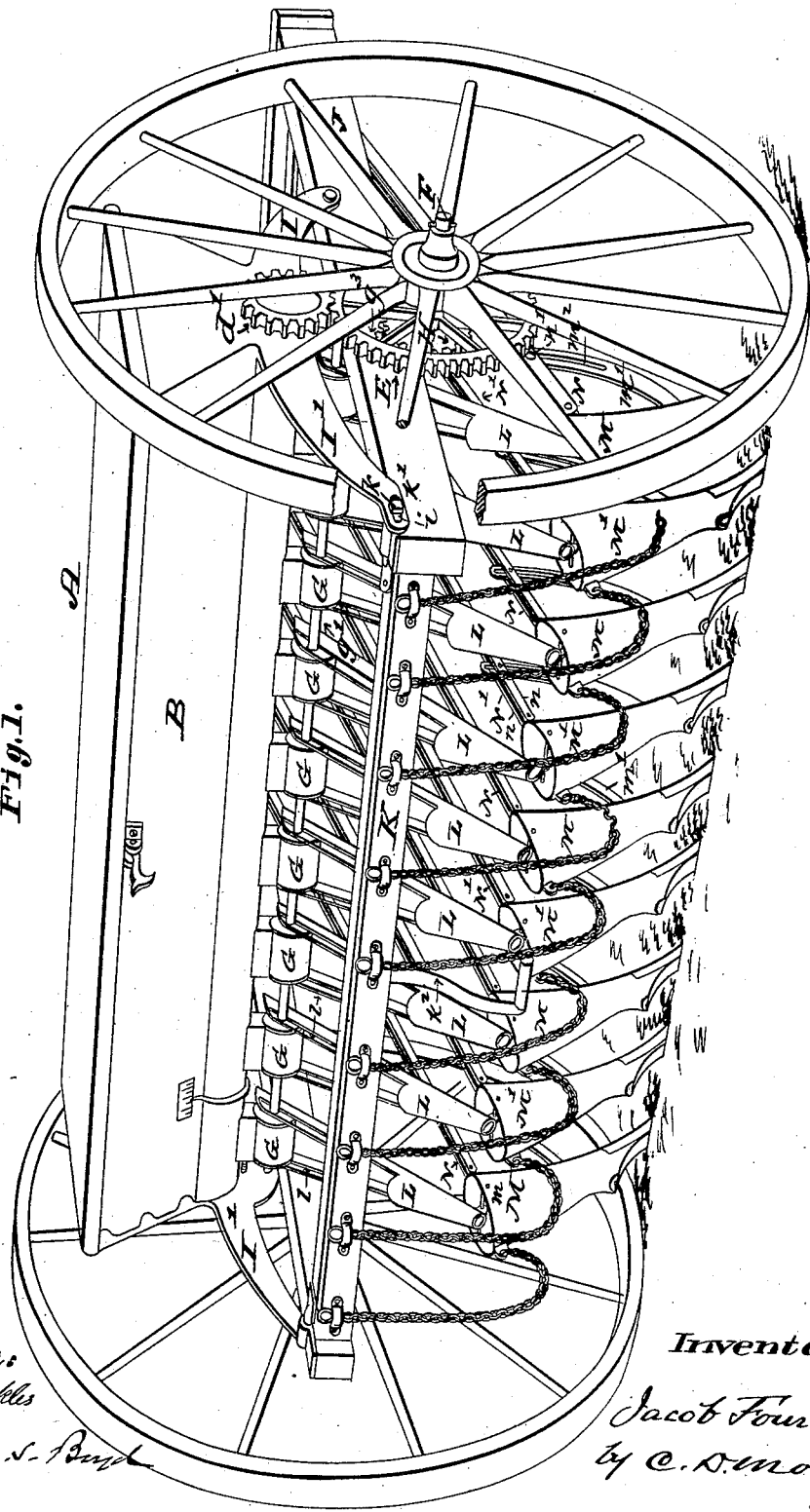

UNITED STATES PATENT OFFICE.

JACOB FOURNIE, OF BELLEVILLE, ILLINOIS.

GRAIN-DRILL.

SPECIFICATION forming part of Letters Patent No. 265,666, dated October 10, 1882.

Application filed March 2, 1882. (No model.)

*To all whom it may concern:*

Be it known that I, JACOB FOURNIE, of Belleville, Illinois, have made a new and useful Improvement in Grain-Drills, of which the following is a full, clear, and exact description, reference being had to the annexed drawings, making part of this specification, in which—

Figure 1 is a view in perspective of the improved machine; Fig. 2, an end elevation of the seed-box and parts immediately therewith connected; Fig. 3, a section taken on the line 3 3 of Fig. 2; Fig. 4, a view showing the opposite end of the seed-box from that shown in Fig. 3, and showing the screw for moving the slide; Fig. 5, a section taken through a seed-cylinder on the line 5 5 of Fig. 6; Fig. 6, a side view of a seed-cylinder; Fig. 7, a longitudinal vertical section taken through the drill; Fig. 8, a view in perspective, showing the connection between the spout and its hoe; Fig. 9, a vertical section taken through the lower end of one of the hoes; Fig. 10, a view in perspective of the mechanism for shifting the hoes; Fig. 11, a view in perspective, showing the part used in tilting the seed-box; and Fig. 12, a view in perspective, showing the forward end of one of the draft-irons.

The same letters denote the same parts.

The present invention has relation to the means used in delivering the seed from the seed-box into the seed-cylinder; to the seed-cylinders; to the means by which the operation of the seed-delivery mechanism is controlled; to the means for shifting the hoes forward and backward; to the connection of the seed-spout and hoe, and to the construction of the lower end of the hoe.

In the annexed drawings, A represents a grain-drill having the improvement. B represents the seed-box. In its bottom is a trough, C, containing a screw, D, the latter being attached to the shaft $d$, turning in bearings at the ends of the trough, and having a gear, $d'$, that engages with a gear, E, upon the axle F. The trough at intervals has openings $c$ $c$, through which the seed is delivered into the seed-cylinders G, and the screw D, at points thereon opposite the farther (considered in the direction in which the seed is moved by the screw) ends of the openings $c$, is provided with disks $d^2$. The disks, together with the partitions $b$ $b$, divide the trough and the lower portion of the seed-box transversely into spaces $c'$ $c'$, and serve as partitions to direct the seed downward through the openings $c$ into the cylinders G. The construction of the latter is shown more distinctly in Figs. 3, 5, 6, having the semi-spherical seed-cells $g$, which are arranged in quincunx order, as shown. The cylinders in length are equal to the length of the openings $c$ $c$, but are not as long as the spaces $c'$. They are fastened to the shaft $g'$, which turns in bearings $g^2$, and is furnished with a gear, $g^3$, which in turn engages with a gear, H, upon the axle F. The seed-box B, carrying the screw D, cylinder G, shaft $d$ $g'$, and gears $d'$ $g^3$, is supported by the legs I I', so that it can be tilted upon its forward legs, I, upward, so as to disengage the gears $d'$ $g^3$ from the gears E H, respectively, the movement being accomplished as follows: The bar K is provided with the crank-axles $k$. The axles turn in bearings $k'$ and engage in slots $i$ in the legs I' I'. By rotating the bar—and for this purpose the handle $k^2$ may be used—the legs I' I' are lifted and the desired disengagement effected. The conductor-spouts L, leading from the seed-cylinders, are by means of the bars $l$ hung and arranged to slide upon the shaft $g'$. At their lower ends the spouts are jointed to the hoes M M', the lower end of the spout having an eye, $l'$, that receives a cross-bar, $m$, that extends across the top of the hoe. The eye $l'$, as shown, is much narrower than the diameter of the hoe. The connection enables the hoe and spout to turn upon each other as the hoes are moved forward and backward and raised and lowered, and also by having but a single and a very narrow connection with each other the hoe and spout can each be slightly twisted upon each other—something liable to occur in use—without straining the connection.

Draft-irons N N' lead from the hoes forward, connecting with the frame O. The latter is composed of two bars, $o$ $o'$, connected at their ends by means of plates $o^2$, having gudgeons $o^3$, the latter turning in suitable bearings (not shown) in the drill-frame J—that is, one half, M, (every other one,) of the hoes are connected by means of the irons N with the bar $o$, and the other half, M', by the irons N' with the bar $o'$. The bars $o$ $o'$ in turn, and by means of the links $p\,p'$, respectively, are connected with a lever, P, that turns on a fulcrum, $p^2$, and by turning the lever on its fulcrum the two sets of hoes are alternately moved forward and backward.

The draft-irons N N' are each made double, as shown at $n\,n$, Figs. 1, 12. Ties $m'$, curved and having slots $m^2$, extend from the hoes forward and upward, passing between the parts $n\,n$, and held thereto by means of the pin $n'$ or screw. The parts $n\,n$ at their forward ends are widened apart, as indicated in Fig. 12.

The hoes at their lower ends, $m^3$, instead of being pointed, as heretofore, are flattened at the toe of the foot, as shown more distinctly in Fig. 9. The aim and effect of such construction is to enable the hoe to move more steadily over the ground. The heel $m^4$ is cut away.

The openings $c$ in the trough C can be graduated by means of the slide Q, the position of the slide being adjusted by means of the screw $q$, Fig. 4.

The trough C, opposite the disks $d^2$, is provided with ribs $c'$.

I am very well aware that the elements herein described are not, in the broadest sense, absolutely new, and therefore shall set up no generic claim for said parts or features; but I do not know that the present structure of these parts and the combination and adaptation, as described, have ever before been known or used.

I claim—

1. The seed cylinder G, having the semi-spherical cells $g$, arranged in quincunx order, substantially as described.

2. The combination of the hoes M M', the draft-irons N N', frame or bar O, bars $o\,o'$, links $p\,p'$, and lever P, substantially as described.

3. The combination of the trough C, having the openings $c$, the continuous screw D, having the disks $d^2$, and the seed-cylinder G, having semi-spherical cells $g$, arranged in quincunx order, substantially as described.

4. The seed-box B, carrying the trough C, having openings $c$, the continuous screw D, having the disks $d^2$, the shaft $g'$, and gears $d'\,g^3$, legs I I', frame J, and crank-axle $k$, substantially as set forth.

5. The combination of the spout L, hung by bar $l$ on the shaft $g'$, the eye $l'$, the hoes M M', said hoes having bars $m$, and made narrow, as shown, to enable the hoe to have lateral or torsional play upon the spout, substantially as described.

6. The combination of the hoe, flattened at the toe end and cut away at the heel, the tie $m'$, having slot $m^2$, the draft-iron N, and the pin $n'$, enabling the lower end of the hoe to be drawn backward without breaking the pin, substantially as described.

JACOB FOURNIE.

Witnesses:
C. D. MOODY,
CHARLES PICKLES.